(12) United States Patent
Guo et al.

(10) Patent No.: US 12,511,866 B2
(45) Date of Patent: Dec. 30, 2025

(54) METHODS AND SYSTEMS FOR TEMPORAL ACTION LOCALIZATION OF VIDEO DATA

(71) Applicants: Yanhui Guo, Hamilton (CA); Deepak Sridhar, San Diego, CA (US); Peng Dai, Markham (CA); Juwei Lu, North York (CA)

(72) Inventors: Yanhui Guo, Hamilton (CA); Deepak Sridhar, San Diego, CA (US); Peng Dai, Markham (CA); Juwei Lu, North York (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 18/327,384

(22) Filed: Jun. 1, 2023

(65) Prior Publication Data

US 2024/0054757 A1 Feb. 15, 2024

Related U.S. Application Data

(60) Provisional application No. 63/397,593, filed on Aug. 12, 2022.

(51) Int. Cl.
| | |
|---|---|
| *G06V 10/62* | (2022.01) |
| *G06V 10/24* | (2022.01) |
| *G06V 10/44* | (2022.01) |
| *G06V 10/764* | (2022.01) |
| *G06V 10/80* | (2022.01) |
| *G06V 10/82* | (2022.01) |

(52) U.S. Cl.
CPC ............ *G06V 10/62* (2022.01); *G06V 10/24* (2022.01); *G06V 10/44* (2022.01); *G06V 10/764* (2022.01); *G06V 10/806* (2022.01); *G06V 10/82* (2022.01)

(58) Field of Classification Search
CPC ...... G06V 10/24; G06V 10/44; G06V 10/454; G06V 10/62; G06V 10/764; G06V 10/806; G06V 10/82; G06V 20/41
See application file for complete search history.

(56) References Cited

U.S. PATENT DOCUMENTS 11,995,796 B2 * 5/2024 Zhang .................... G06N 3/048

OTHER PUBLICATIONS

Liu et al. "BMN: Boundary Matching Networks for Temporal Action Localization", ICCV, 2019.
(Continued)

*Primary Examiner* — Manuchehr Rahmjoo

(57) ABSTRACT

Systems and methods for temporal action localization of video data are described. A feature representation extracted from video data has a temporal dimension and a spatial dimension. The feature representation is self-aligned in the spatial dimension. Spatial multi-sampling is performed to obtain a plurality of sparse samples of the self-aligned representation along the spatial dimension, and the multi-sampled representation is fused with the self-aligned representation. Attention-based context information aggregation is applied on the fused representation to obtain a spatially refined representation. Local temporal information aggregation is applied on the self-aligned representation to obtain a temporally refined representation. Action localization is performed on a concatenation of the spatially refined representation and the temporally refined representation.

18 Claims, 10 Drawing Sheets

(56) References Cited

OTHER PUBLICATIONS

Runhao Zeng et al., "Graph Convolutional Networks for Temporal Action Localization", ICCV, 2019.
Mengmeng Xu et al., "G-TAD: Sub-Graph Localization for Temporal Action Detection", CVPR, 2020.
Jialin Gao et al., "Accurate temporal action proposal generation with relation-aware pyramid network", AAAI, 2020.
Lin et al., "Fast learning of temporal action proposal via dense boundary generator", AAAI 2020.
Li et al., "Three Birds with One Stone: Multi-Task Temporal Action Detection via Recycling Temporal Annotations", CVPR 2021.
Sridhar et al., "Class semantics-based attention for action detection", ICCV, 2021.
Wang et al., "RCL: Recurrent Continuous Localization for Temporal Action Detection", CVPR 2022.

* cited by examiner

METHODS AND SYSTEMS FOR TEMPORAL ACTION LOCALIZATION OF VIDEO DATA

CROSS-REFERENCE TO RELATED APPLICATIONS

This disclosure claims priority from U.S. provisional patent application No. 63/397,593, filed Aug. 12, 2022, entitled "DCIA: LEARNING DUAL CONTEXT INFORMATION AGGREGATION DETECTION HEAD FOR TEMPORAL ACTION LOCALIZATION", the entirety of which is incorporated herein by reference.

FIELD

The present disclosure relates to methods and systems for analyzing and annotating video data, including temporal action localization of video data.

BACKGROUND

Video understanding, in the context of computer vision, refers to processing video data in order to extract meaningful information about the content of the video. Video understanding may involve one or more tasks that may be performed by a machine learning-based computer vision system, including, for example, video classification, captioning, among others. Video understanding is useful for many practical applications of video data, such as video analysis, patient monitoring, video surveillance, video searching and retrieval and video recommendation, among others.

Compared to static image data, video data has a temporal component. Accordingly, it is useful to provide solutions for extracting information from video data while accounting for the temporal nature of the data.

SUMMARY

In various examples, the present disclosure describes systems and methods for temporal action localization. Examples of the present disclosure describe a temporal action localization system including modules for spatial feature alignment, local and global temporal information aggregation, and multi-head sampling. This provides a technical solution to the problem of temporal action localization of video data.

Examples of the present disclosure may be useful for various video understanding tasks, and may be applicable to video retrieval, video grounding and/or video recommendation tasks. Examples of the present disclosure may enable improved temporal action localization, even when there is spatial misalignment in the video frames.

In an example aspect, the present disclosure describes a temporal action localization system including a processing unit configured to execute instructions to cause the system to: receive a feature representation extracted from a video data, the feature representation having a temporal dimension and a spatial dimension; process the feature representation to obtain a self-aligned representation that is aligned in the spatial dimension; perform spatial multi-sampling of the self-aligned representation to obtain a multi-sampled representation, wherein performing the spatial multi-sampling includes obtaining a plurality of sparse samples of the self-aligned representation along the spatial dimension; fuse the self-aligned representation and the multi-sampled representation to obtain a fused representation; apply attention-based context information aggregation on the fused representation to obtain a spatially refined representation; apply local temporal information aggregation on the self-aligned representation to obtain a temporally refined representation; and perform action localization on a concatenation of the spatially refined representation and the temporally refined representation to obtain at least one boundary proposal for temporal action localization of an action in the video data.

In an example of the preceding example aspect of the system, the processing unit may be configured to cause the system to implement a self-alignment module to align the feature representation in the spatial dimension, the self-alignment module may include a plurality of neural network layers including at least a fully connected layer and an alignment layer.

In an example of any of the preceding example aspects of the system, the processing unit may be configured to cause the system to implement a multi-head sampling module to perform the spatial multi-sampling, the multi-head sampling module may include a plurality of neural network layers including a plurality of trained 1D sampling layers, each 1D sampling layer being configured to obtain a respective vector of sparse samples along a respective index in the spatial dimension, the vectors of sparse samples being combined to obtain the multi-sampled representation.

In an example of any of the preceding example aspects of the system, the processing unit may be configured to cause the system to implement an attention-based context information aggregation module to perform the attention-based context information aggregation, the attention-based context information aggregation module may include: a global temporal attention block configured to apply global temporal attention to the fused representation to obtain a temporally-weighted representation; and a spatial attention block configured to apply spatial attention to the fused representation to obtain a spatially-weighted representation; wherein the spatially refined representation may be obtained by concatenating the temporally-weighted representation and the spatially-weighted representation.

In an example of any of the preceding example aspects of the system, the processing unit may be configured to cause the system to implement a local temporal information aggregation module to perform the local temporal information aggregation, the local temporal information aggregation module may include a plurality of neural network layers including one or more temporally dynamic convolution layers.

In an example of any of the preceding example aspects of the system, a plurality of boundary proposals may be obtained, and the processing unit may be configured to cause the system to: aggregate the plurality of boundary proposals to obtain one boundary proposal to temporally localize the action in the video data.

In an example of the preceding example aspect of the system, each of the plurality of boundary proposals may be associated with a respective confidence score, wherein aggregating the plurality of boundary proposals may include aggregating a defined number of boundary proposals having highest confidence scores.

In an example of the preceding example aspect of the system, each of the plurality of boundary proposals may be associated with a respective action classification, wherein the action classifications may be aggregated using the confidence scores as weighting, and one aggregated action classification may be assigned to the action in the video data.

In an example of any of the preceding example aspects of the system, the processing unit may be configured to cause the system to store the video data with at least one assigned boundary proposal in a video database.

In an example of any of the preceding example aspects of the system, the processing unit may be configured to cause the system to implement a feature extractor to extract the feature representation from the video data, wherein the extracted feature representation may be an implicit neural action field.

In another example aspect, the present disclosure describes a method including: receiving a feature representation extracted from a video data, the feature representation having a temporal dimension and a spatial dimension; processing the feature representation to obtain a self-aligned representation that is aligned in the spatial dimension; performing spatial multi-sampling of the self-aligned representation to obtain a multi-sampled representation, wherein performing the spatial multi-sampling includes obtaining a plurality of sparse samples of the self-aligned representation along the spatial dimension; fusing the self-aligned representation and the multi-sampled representation to obtain a fused representation; applying attention-based context information aggregation on the fused representation to obtain a spatially refined representation; applying local temporal information aggregation on the self-aligned representation to obtain a temporally refined representation; and performing action localization on a concatenation of the spatially refined representation and the temporally refined representation to obtain at least one boundary proposal for temporal action localization of an action in the video data.

In an example of the preceding example aspect of the method, the feature representation may be processed by a self-alignment module to align the feature representation in the spatial dimension, the self-alignment module may include a plurality of neural network layers including at least a fully connected layer and an alignment layer.

In an example of any of the preceding example aspects of the method, the spatial multi-sampling may be performed by a multi-head sampling module including a plurality of neural network layers including a plurality of trained 1D sampling layers, each 1D sampling layer being configured to obtain a respective vector of sparse samples along a respective index in the spatial dimension, the vectors of sparse samples being combined to obtain the multi-sampled representation.

In an example of any of the preceding example aspects of the method, the attention-based context information aggregation may be performed by an attention-based context information aggregation module including: a global temporal attention block configured to apply global temporal attention to the fused representation to obtain a temporally-weighted representation; and a spatial attention block configured to apply spatial attention to the fused representation to obtain a spatially-weighted representation; wherein the spatially refined representation may be obtained by concatenating the temporally-weighted representation and the spatially-weighted representation.

In an example of any of the preceding example aspects of the method, the local temporal information aggregation may be performed by a local temporal information aggregation module including a plurality of neural network layers including one or more temporally dynamic convolution layers.

In an example of any of the preceding example aspects of the method, a plurality of boundary proposals may be obtained, the method may further include: aggregating the plurality of boundary proposals to obtain one boundary proposal to temporally localize the action in the video data.

In an example of the preceding example aspect of the method, each of the plurality of boundary proposals may be associated with a respective confidence score, wherein aggregating the plurality of boundary proposals may include aggregating a defined number of boundary proposals having highest confidence scores.

In an example of the preceding example aspect of the method, each of the plurality of boundary proposals may be associated with a respective action classification, wherein the action classifications may be aggregated using the confidence scores as weighting, and one aggregated action classification may be assigned to the action in the video data.

In an example of any of the preceding example aspects of the method, the method may include: extracting the feature representation from the video data, wherein the extracted feature representation is an implicit neural action field.

In another example aspect, the present disclosure describes a non-transitory computer-readable medium storing computer-executable instructions, wherein the instructions are executable by a processing unit of a computing system to cause the system to: receive a feature representation extracted from a video data, the feature representation having a temporal dimension and a spatial dimension; process the feature representation to obtain a self-aligned representation that is aligned in the spatial dimension; perform spatial multi-sampling of the self-aligned representation to obtain a multi-sampled representation, wherein performing the spatial multi-sampling includes obtaining a plurality of sparse samples of the self-aligned representation along the spatial dimension; fuse the self-aligned representation and the multi-sampled representation to obtain a fused representation; apply attention-based context information aggregation on the fused representation to obtain a spatially refined representation; apply local temporal information aggregation on the self-aligned representation to obtain a temporally refined representation; and perform action localization on a concatenation of the spatially refined representation and the temporally refined representation to obtain at least one boundary proposal for temporal action localization of an action in the video data.

In some examples of the preceding example aspect of the computer-readable medium, the instructions may be executable to cause the system to perform any of the preceding example aspects of the method.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Temporal action localization (TAL) refers to a task, typically performed using trained machine learning models, of detecting action in video data (including untrimmed video data) and predicting the timestamps for the start and end of the detected action. The TAL task may involve extracting both local and global spatiotemporal information from the video data. TAL may be useful for various video processing tasks such as video annotation tasks, which may be relevant for video database applications (e.g., video search and retrieval), among other applications.

However, there remain challenges with accurate detection and localization of action in video data. For example, challenges may arise due to similar object instances occurring in different video segments (where a video segment may be a continuous sequence of one or more video frames within the video data) with different action contexts (e.g., a person may appear in one video segment performing a walking action and the same person may appear in another video segment performing a dancing action). In another example, challenges may arise due to misaligned spatial focus of actions, meaning that the focus of an action (e.g., the object performing the action) may be spatially shifted between frames.

Existing techniques for TAL have some drawbacks. For example, some techniques require extensive end-to-end training of a machine learning model, which may be costly, time consuming and/or may require compromise by having to reduce the video resolution or network complexity. Further, the lack of large training datasets that have been suitably annotated for the TAL task means that end-to-end training of a machine learning model for TAL may not achieve a desired level of performance.

In various examples, the present disclosure describes a TAL system that addresses at least some drawbacks of existing solutions. For example, the disclosed TAL system may help to address the problem of spatial misalignment and/or different action contexts in video data. The TAL system as disclosed herein may be embodied as a computing system or as a collection of computing systems, for example.

Figure 1:
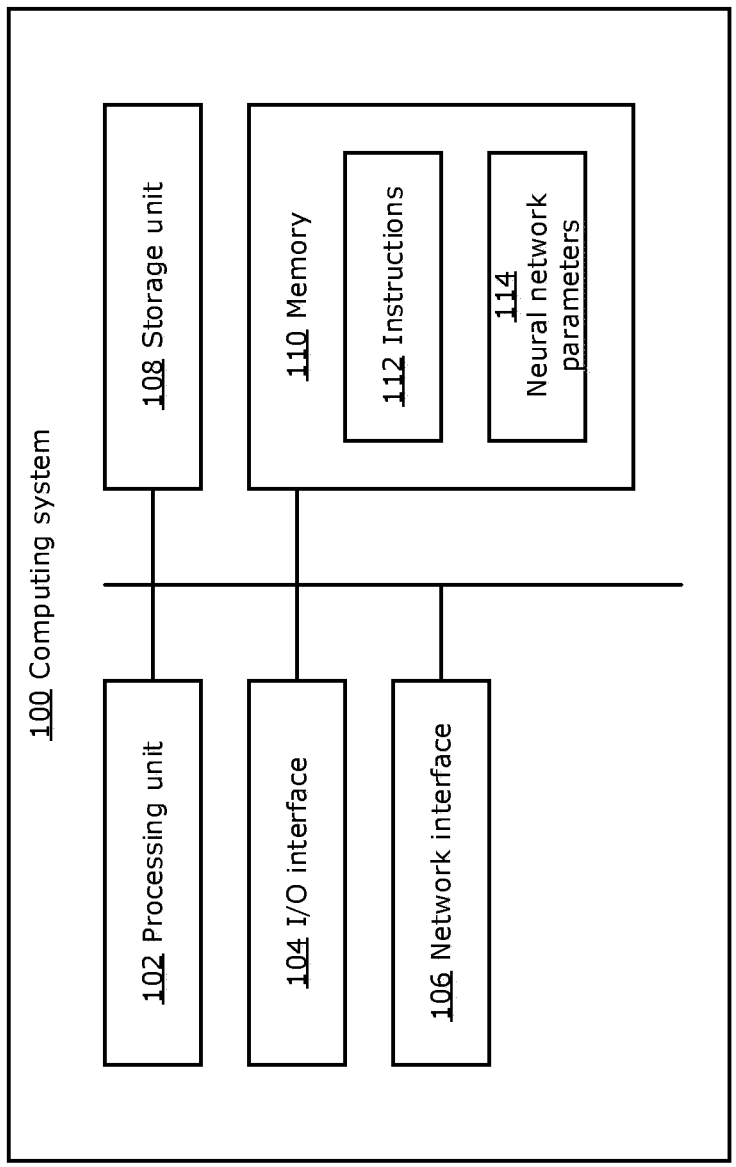
FIG. 1 is a block diagram illustrating an example computing system, which may be used to implement examples of the present disclosure.

FIG. 1 is a block diagram of an example computing system 100 that may be used to implement examples disclosed herein. The computing system 100 may represent a server, for example. In some examples, the computing system 100 may be part of a cloud-based system or virtual machine. Although FIG. 1 shows a single instance of each component, there may be multiple instances of each component in the computing system 100. The computing system 100 may be used to execute instructions for training a neural network and/or for executing a trained neural network, as discussed further below. It should be understood that examples of the present disclosure may be implemented using various suitable hardware configurations, which may involve one or more instances of the computing system 100 and/or other computing hardware.

In this example, the computing system 100 includes at least one processing unit 102, such as a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 100 may include an input/output (I/O) interface 104, which may enable interfacing with an input device and/or output device (not shown).

The computing system 100 may include a network interface 106 for wired or wireless communication with other computing systems. The network interface 106 may include wired links (e.g., Ethernet cable) and/or wireless links (e.g., one or more antennas) for intra-network and/or inter-network communications.

The computing system 100 may include a storage unit 108, which may include a mass storage unit such as a solid state drive, a hard disk drive, a magnetic disk drive and/or an optical disk drive.

The computing system 100 may include a memory 110, which may include a volatile or non-volatile memory (e.g., a flash memory, a random access memory (RAM), and/or a read-only memory (ROM)). The non-transitory memory 110 may store instructions 112 for execution by the processing unit 102, such as to carry out example embodiments described in the present disclosure. For example, the memory 110 may store instructions 112 for implementing neural network architecture and/or methods disclosed herein. The memory 110 may also store neural network parameters 114, which may be parameters learned from training a neural network, as disclosed herein. The memory 110 may include other software instructions, such as for implementing an operating system and other applications/functions.

The computing system 100 may additionally or alternatively execute instructions from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Figure 2:
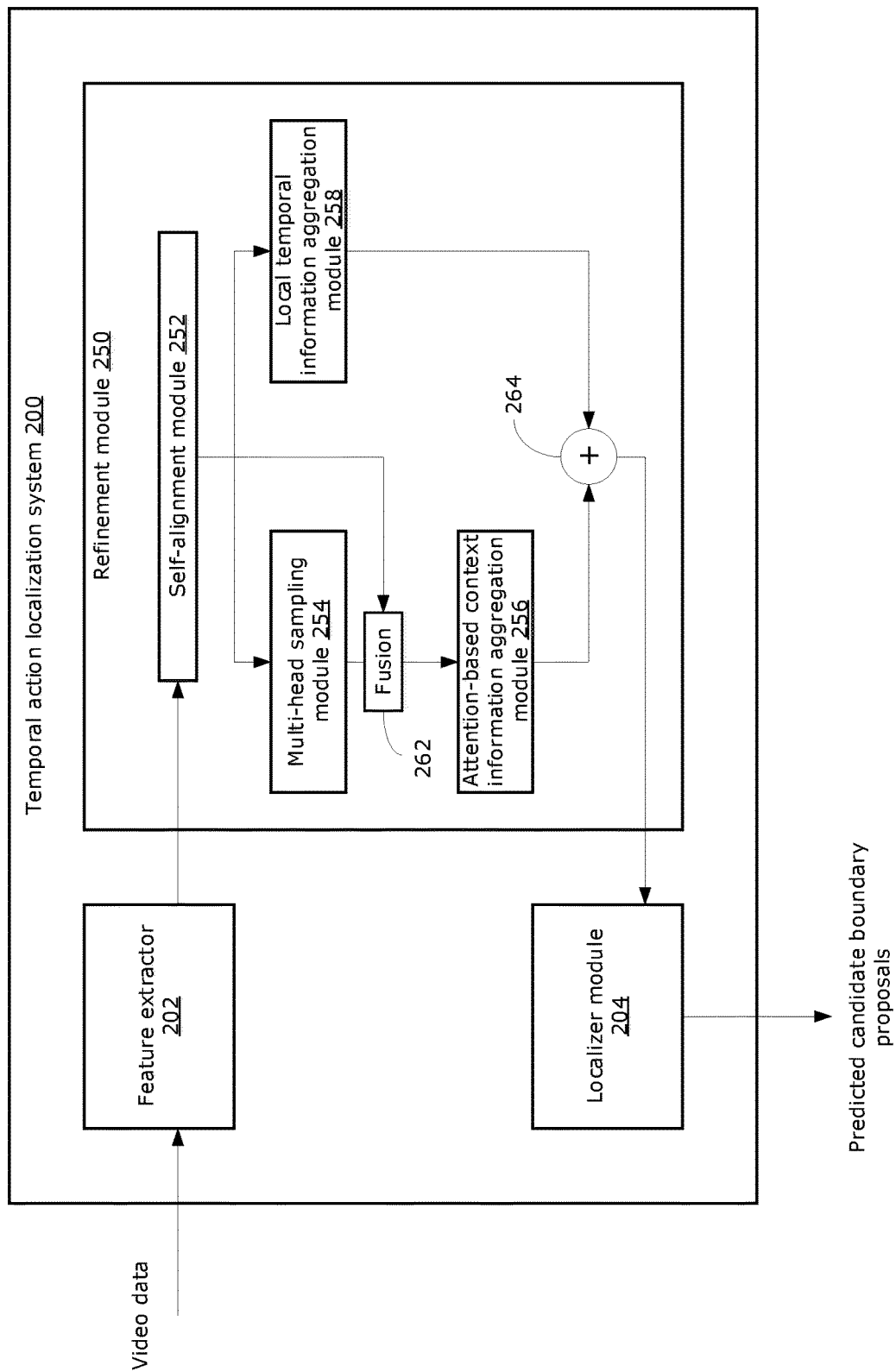
FIG. 2 is a block diagram of an example temporal action localization system, in accordance with examples of the present disclosure.

FIG. 2 is a schematic diagram illustrating an example neural network-based TAL system 200. The TAL system 200 may be used to implement a machine learning model for performing a TAL task. The TAL system 200 may be implemented using the computing system 100. For example, instructions for executing the TAL system 200 and values of trained neural network parameters may be stored in the memory 110 of the computing system 100 and may be executed by the processing unit 102.

In some examples, the TAL system 200 may be embodied as a cloud-based platform that provides a TAL service. For example, there may be one or more computing systems 100 providing resources together to implement the TAL system 200. Another computing system such as a server managing a database of video data may communicate one (or more) video data to the TAL system 200 in order to access the services of the TAL system 200 for detecting and localizing action in the video data.

The example TAL system 200 includes a feature extractor 202, a refinement module 250 and a localizer module 204. The refinement module 250 in this example includes a self-alignment module 252, a multi-head sampling module 254, an attention-based context information aggregation module 256 and a local temporal information aggregation module 258. It should be understood that the modules illustrated in FIG. 2 are not intended to be limiting. The TAL system 200 may include greater or fewer number of modules. Functions described as being performed by a particular module may be performed by a different module, and/or may be a function of the overall TAL system 200. In some examples, the feature extractor 202 and/or the localizer module 204 may be external to the TAL system 200.

Various modules of the TAL system 200 may be implemented using neural networks, which may be trained using suitable machine learning techniques. Prior to deployment of the TAL system 200 (e.g., prior to executing the TAL system 200 for processing real-world video data), the TAL system 200 may be trained to learn values for neural network parameters, and the learned parameters may be stored in memory. In some examples, the feature extractor 202 may be pre-trained or may be trained separately from other modules of the TAL system 200. In some examples, the feature extractor 202 may be pre-trained, while the refinement module 250 and the localizer module 204 may be trained together (e.g., end-to-end training).

The TAL system 200 receives untrimmed video data as input. The video data may be received in the form of a set of video frames, where each video frame corresponds to a respective timestamp of the video. The video data is processed by the feature extractor 202. The feature extractor 202 may be implemented using a suitable neural network-based video encoder, for example using layers such as convolutional layers and pooling layers. Examples of suitable neural networks that may be used as the feature extractor 202 include temporal segment networks (TSNs), such as described by Wang et al. "Temporal segment networks for action recognition in videos," *IEEE Transactions on Pattern Analysis and Machine Intelligence*, vol. 41, no. 11, pp. 2740-2755, 2018; networks with temporally-sensitive pretraining (TSP), such as described by Alwassel et al. "TSP: Temporally-Sensitive Pretraining of Video Encoders for Localization Tasks", in *Proceedings of the IEEE/CVF International Conference on Computer Vision*, 2021, pp. 3173-3183; or multimodal versatile (MMV) networks, such as described by Alayrac et al. "Self-Supervised Multimodal Versatile Networks," *Advances in Neural Information Processing Systems*, vol. 33, pp. 25-37, 2020. The output of the feature extractor 202 is a feature representation, which may be in the form of a 2D implicit neural action field (INAF) (also referred to as an INAF representation). The present disclosure may refer to an INAF as an example of a feature representation (or more simply referred to as a "representation"), however it should be understood that this is not intended to be limiting. The feature representation may be other types of feature representations that are capable of representing information in a temporal dimension as well as a spatial dimension. The extracted feature representation encodes spatiotemporal information of the input video data. The extracted feature representation may be a 2D feature representation (e.g., an INAF) in which spatial information is encoded along one dimension and temporal information is encoded along a second dimension. Each extracted feature may thus have a spatial component (e.g., information about the position of the feature in the video data) and a temporal component (e.g., information about the timestamp or frame index of the feature within the video data). It should be noted that any spatial misalignment in the video data (e.g., due to the position of an object being changed between video frames) is also encoded in the extracted feature representation.

It should be noted that, in some examples, the feature extractor 202 may be used to process video data ahead of time and the video data may be stored with the associated extracted feature representation. Then, at some later time, the video data and associated feature representation may be retrieved from storage and further processed by the refinement module 250 and localizer module 204 as discussed below. In some examples, the feature extractor 202 may be external to the TAL system 200 and may be implemented by a separate computing system. For example, the TAL system 200 may be embodied as a cloud-based platform that provides a TAL service. Another computing system such as a server managing a database of video data may use a feature extractor 202 to extract feature representations for all the video data stored in its database. Then the other computing system may communicate one (or more) video data with associated feature representation to the TAL system 200 in order to access services of the TAL system 200 to detect and localize action in the video data.

The feature representation is inputted to the refinement module 250. As will be discussed further below, the refinement module 250 performs operations to address the spatial misalignment in the feature representation. In this example, the refinement module 250 also performs operations to enhance temporal information from the feature representation. The output from the refinement module 250 is a refined feature representation, which may be a refined INAF.

The set of refined feature representations may be inputted to the localizer module 204. The localizer module 204 may be any suitable neural network designed to perform an action localization task. Examples of suitable neural networks that may be used as the localizer module 204 include boundary-matching networks (BMNs), such as described by Lin et al. "BMN: Boundary-Matching Network for Temporal Action Proposal Generation", in *IEEE International Conference on Computer Vision (ICCV)*, 2019; or networks with sub-graph localization for temporal action detection (G-TAD), such as described by Xu et al. "G-TAD: Sub-Graph Localization for Temporal Action Detection," in *Proceedings of the IEEE/CVF Conference on Computer Vision and Pattern Recognition*, 2020, pp. 10156-10165. The localizer module 204 generates multiple boundary proposals, where each boundary proposal includes a start timestamp and an end timestamp for a predicted action in the video data. Each boundary proposal may also be associated with a confidence score and predicted classification for the action. The boundary proposals may be sorted by confidence score and a defined number (e.g., one or five) of boundary proposals having the highest confidence scores may be selected. The selected boundary proposals and respective associated action classifications may then be assigned to the video data (e.g., stored with the video data as metadata). For example, each action classification assigned to the video data may be associated with a start timestamp and an end timestamp that define the start and end of the action in the video data. In this way, action in the video data may be detected, classified and temporally localized.

Details of the refinement module 250 are now discussed. As previously mentioned, the refinement module 250 may include sub-modules such as the self-alignment module 252, the multi-head sampling module 254, the attention-based context information aggregation module 256 and the local temporal information aggregation module 258. The refinement module 250 may include greater or fewer sub-modules than that shown. For example, the refinement module 250 may include the self-alignment module 252 only; may include the self-alignment module 252, the multi-head sampling module 254 and the attention-based context information aggregation module 256 only; or may include all four sub-modules as shown. Additionally, the refinement module 250 may perform operations, such as a fusion operation 262 and a concatenation operation 264.

Figure 3A:
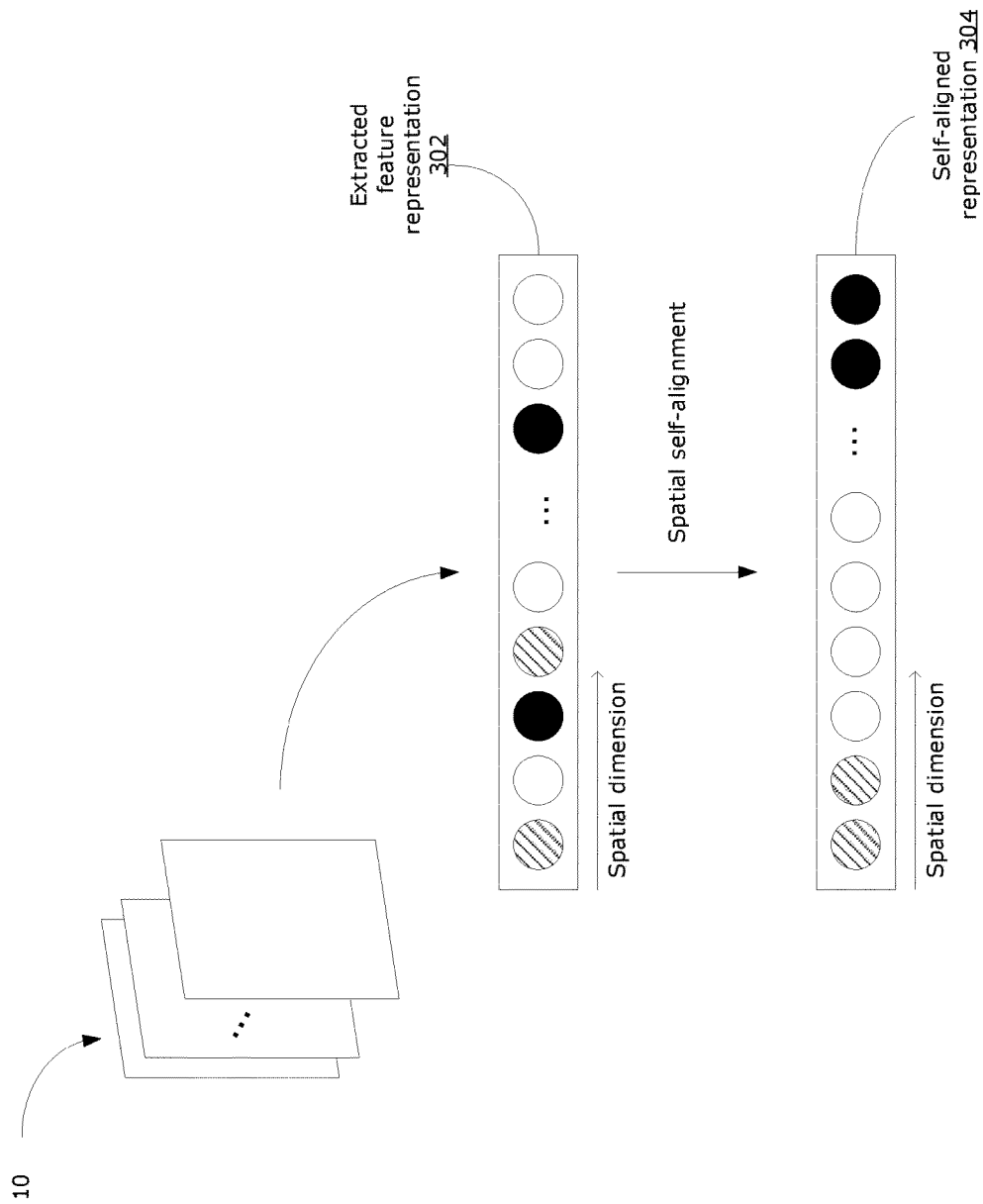
FIGS. 3A-3B illustrate an example self-alignment module, which may be implemented in the example temporal action localization system of FIG. 2.
Figure 3B:
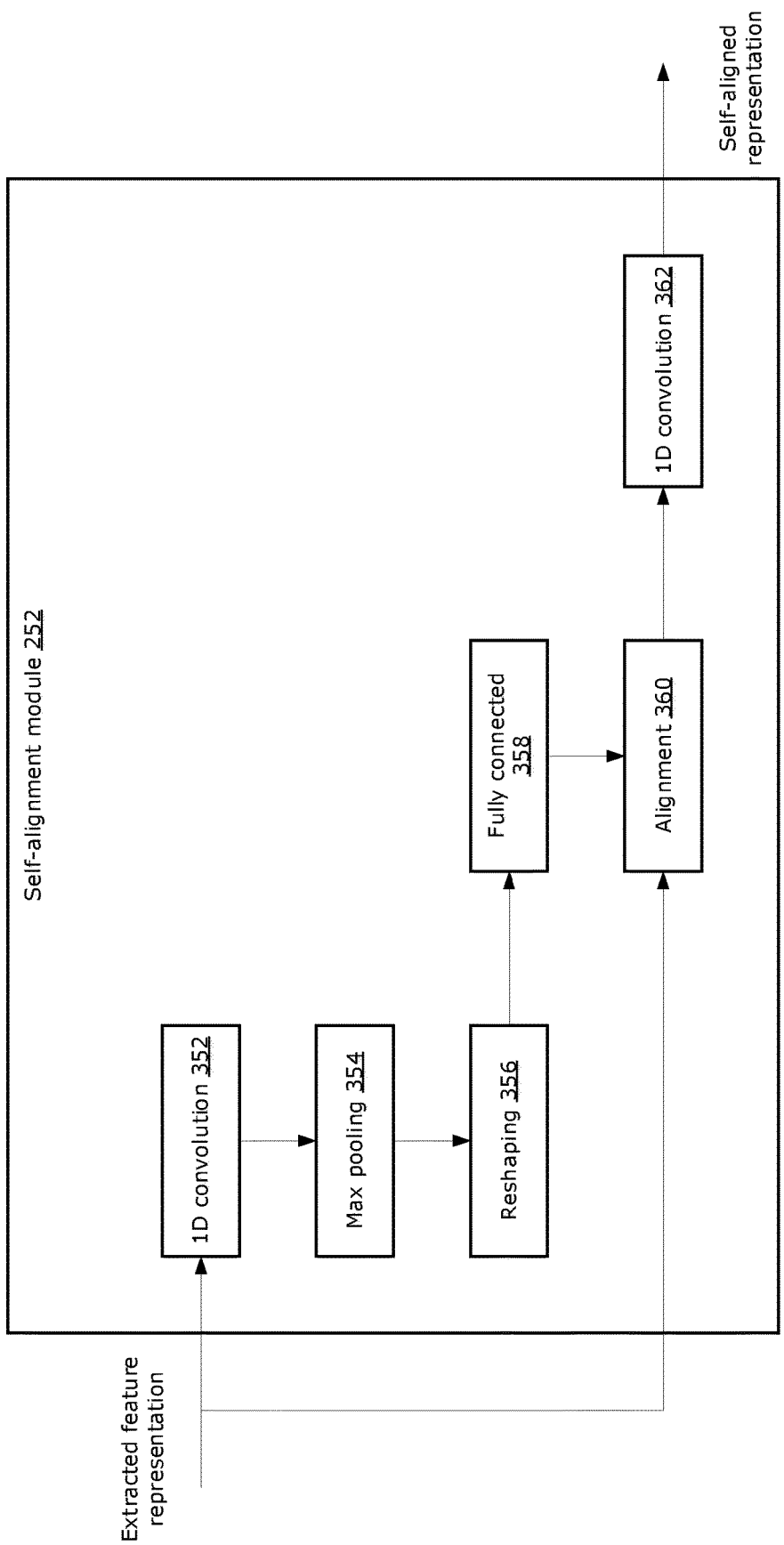

Reference is now made to FIGS. 3A and 3B. FIG. 3A illustrates a simplified example of spatial self-alignment, which may be performed by the self-alignment module 252. FIG. 3B illustrates an example neural network architecture for implementing the self-alignment module 252.

The self-alignment module 252 performs operations to spatially align the feature representation. That is, the self-alignment module 252 performs operations to align the feature representation in the spatial dimension such that similar features that occur along the temporal dimension are grouped together at the same (or similar) index along the spatial dimension.

FIG. 3A is a simplified diagram illustrating the concept of spatial self-alignment. Video data 10, comprising a set of video frames, is processed by the feature extractor 202 (not shown) to extract a feature representation 302. For simplicity, only one row of the feature representation 302 along the spatial dimension is shown. The feature representation 302 includes features, which are ascribed different shading in FIG. 3A to illustrate similarity and differences. The spatial self-alignment performed by the self-alignment module 252 results in a self-aligned representation 304. As illustrated in FIG. 3A, the features in the self-aligned representation 304 are aligned along the spatial dimension such that similar features (indicated by similar shading) are grouped together at the same (or similar) index along the spatial dimension.

FIG. 3B illustrates an example neural network architecture of the self-alignment module 252. It should be understood that the example architecture shown in FIG. 3B is not intended to be limiting. Any suitable self-attention architecture may be adapted for performing the spatial self-alignment task. In general, the self-alignment module 252 performs spatial self-alignment to help correct for the implicit spatial misalignment that may be present in the feature representation 302. Such spatial self-alignment is often needed for accurate action localization because the focus of an action (e.g., the object performing the action) is often spatially shifted through the timestamps of the video. Spatial misalignment may make it difficult for the temporal boundaries of the action to be accurately predicted. Thus, the spatial self-alignment performed by the self-alignment module 252 may help to improve the accuracy of predictions by the TAL system 200.

In the example of FIG. 3B, the self-alignment module 252 includes a 1D convolution layer 352 following by a max pooling layer 354 (there may be multiple instances of the 1D convolution layer 352 and max pooling layer 354) and a reshaping layer 356. A fully connected layer 358 is next, which introduces an attention mechanism. The output of the fully connected layer 358 and the feature representation are inputted to an alignment layer 360. The alignment layer 360 processes the two inputs to predict a set of transformation parameters to be applied to the spatial components of the feature representation at each temporal channel. For each temporal channel, the estimated transformation parameters form an affine transformation. The aligned features are processed by another 1D convolution layer 362, the output of which is the self-aligned representation.

Reference is again made to FIG. 2. As shown, the output of the self-alignment module 252 is provided to two branches of the refinement module 250. One branch, which includes the multi-head sampling module 254 and the attention-based context information aggregation module 256, may be referred to as the spatial branch as the goal of this branch is to aggregate spatial information. Another branch, which includes the local temporal information aggregation module 258, may be referred to as the temporal branch as the goal of this branch is to aggregate temporal information. The spatial branch is first discussed.

The self-alignment module 252 performs spatial alignment in a global and linear manner. However, such global and linear spatial alignment may be relatively coarse and may still leave behind some spatial misalignments. This is because the information encoded in the feature representation, which represent motion in the video data, may be present in an abstract form, meaning that more local and non-linear spatial alignment may be required. In order to perform more local spatial alignment, the multi-head sampling module 254 performs operations to obtain samples from the self-aligned representation.

Figure 4A:
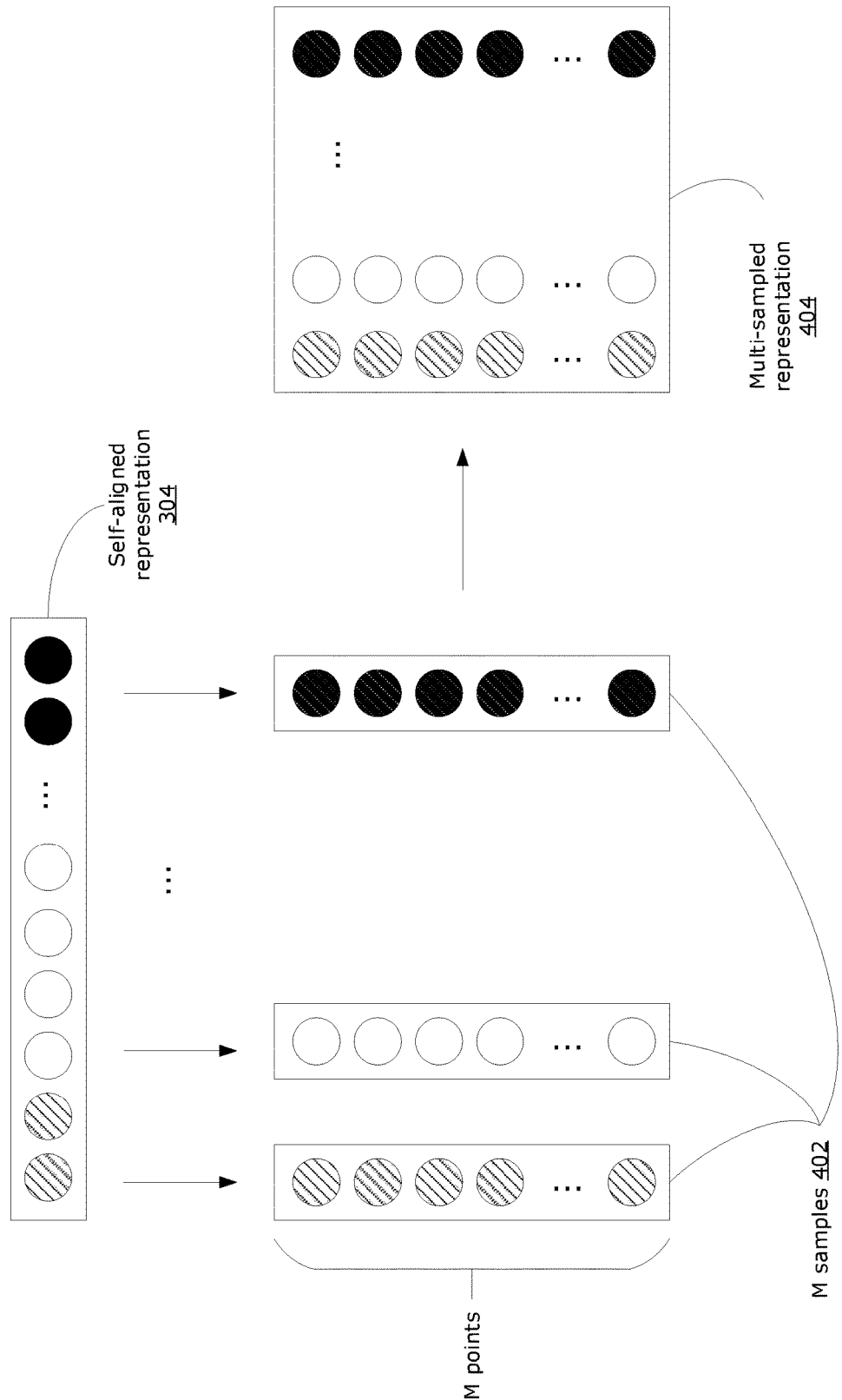
FIGS. 4A-4C illustrate example multi-head sampling module and fusion operation, which may be implemented in the example temporal action localization system of FIG. 2.
Figure 4B:
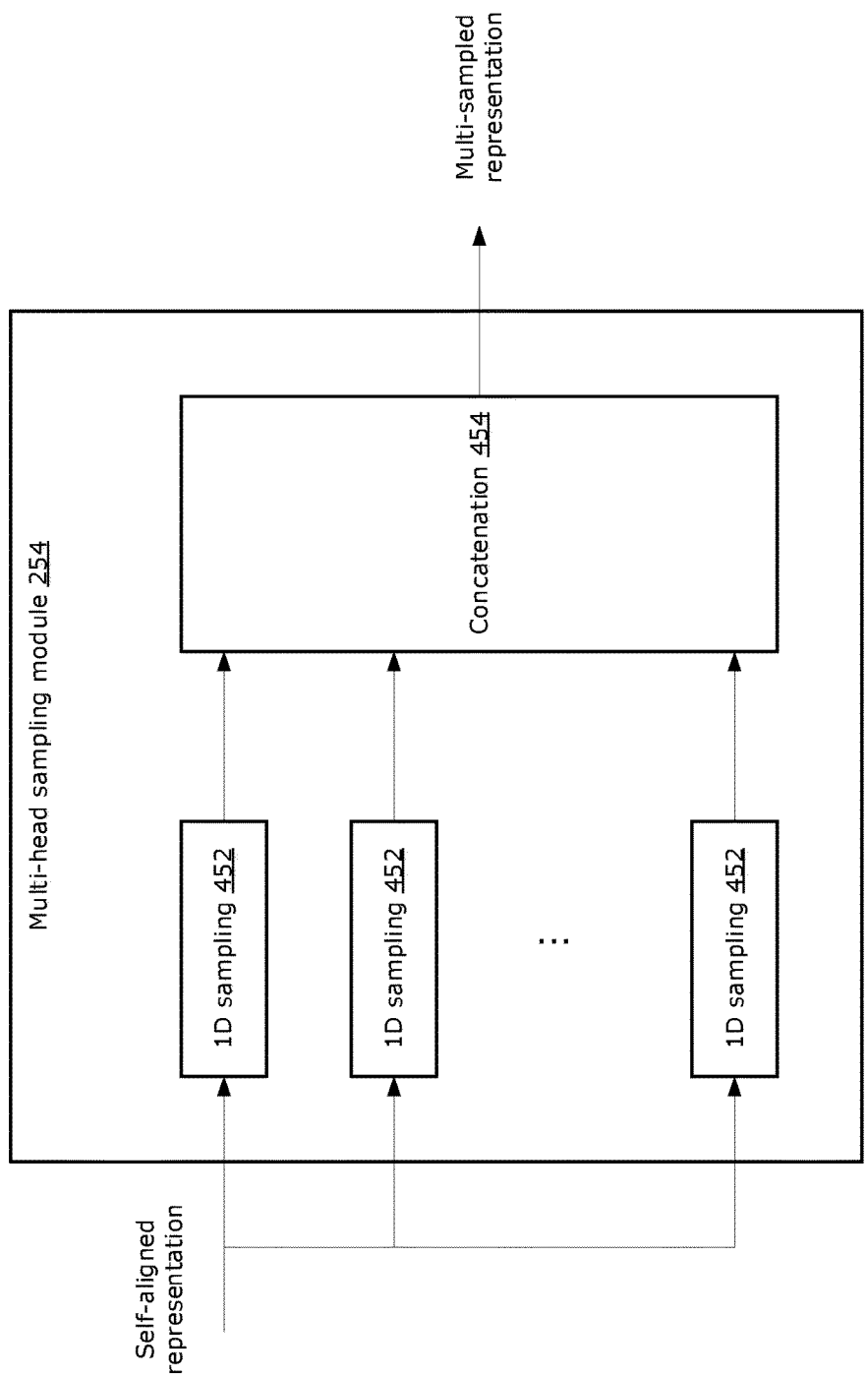

Reference is now made to FIGS. 4A and 4B. FIG. 4A illustrates a simplified example of multi-head sampling, which may be performed by the multi-head sampling module 254. FIG. 4B illustrates an example neural network architecture for implementing the multi-head sampling module 254.

FIG. 4A is a simplified diagram illustrating the concept of multi-head sampling. The multi-head sampling module 254 processes the self-aligned representation 304 to obtain M samples 402, where M is some arbitrary number smaller than the spatial dimension of the self-aligned representation 304. Each of the M samples 402 contains M sampled points. The M samples 402 are then combined into a multi-sampled representation 404. Each of the M samples 402 is obtained by sampling M points along the spatial dimension of the self-aligned representation 304. Each sample 402 represents a sub-representation group containing features with high spatial correlation. The resulting multi-sampled representation 404 contains information about the spatial correlation, which may enable attention to be appropriately applied to more important spatial regions.

FIG. 4B illustrates an example neural network architecture of the multi-head sampling module 254. It should be understood that the example architecture shown in FIG. 4B is not intended to be limiting. In this example, the multi-head sampling module 254 receives the self-aligned representation 304 as input and obtains M samples using M 1D sampling layers 452. Each 1D sampling layer 452 may be, for example, a 1D convolutional layer, however it should be understood that the M samples may be obtained using other layer types, such as M fully connected layers instead. Each 1D sampling layer 452 samples M points along a respective index in the spatial dimension. The indices sampled by each 1D sampling layer 452 are learned from training such that the obtained M samples are context-related. Further, the 1D sampling layers 452 are trained such that the obtained M samples are useful for prediction of action boundaries. The M samples are combined (e.g., using a concatenation operation 454) to form the multi-sampled representation 404.

Reference is again made to FIG. 2. The multi-sampled representation from the multi-head sampling module 254 and the self-aligned representation from the self-alignment module 252 may be fused by a fusion operation 262 to obtain a fused representation. This fusion results in feature representation in which semantically similar features are clustered together based on their interior correlation, which may help with the performance of a subsequent localization task. In some examples, the fusion operation 262 may be considered to be a function of the multi-head sampling module 254, in which case the multi-head sampling module 254 may also be referred to as a multi-head sampling and fusion (MHSF) module.

Figure 4C:
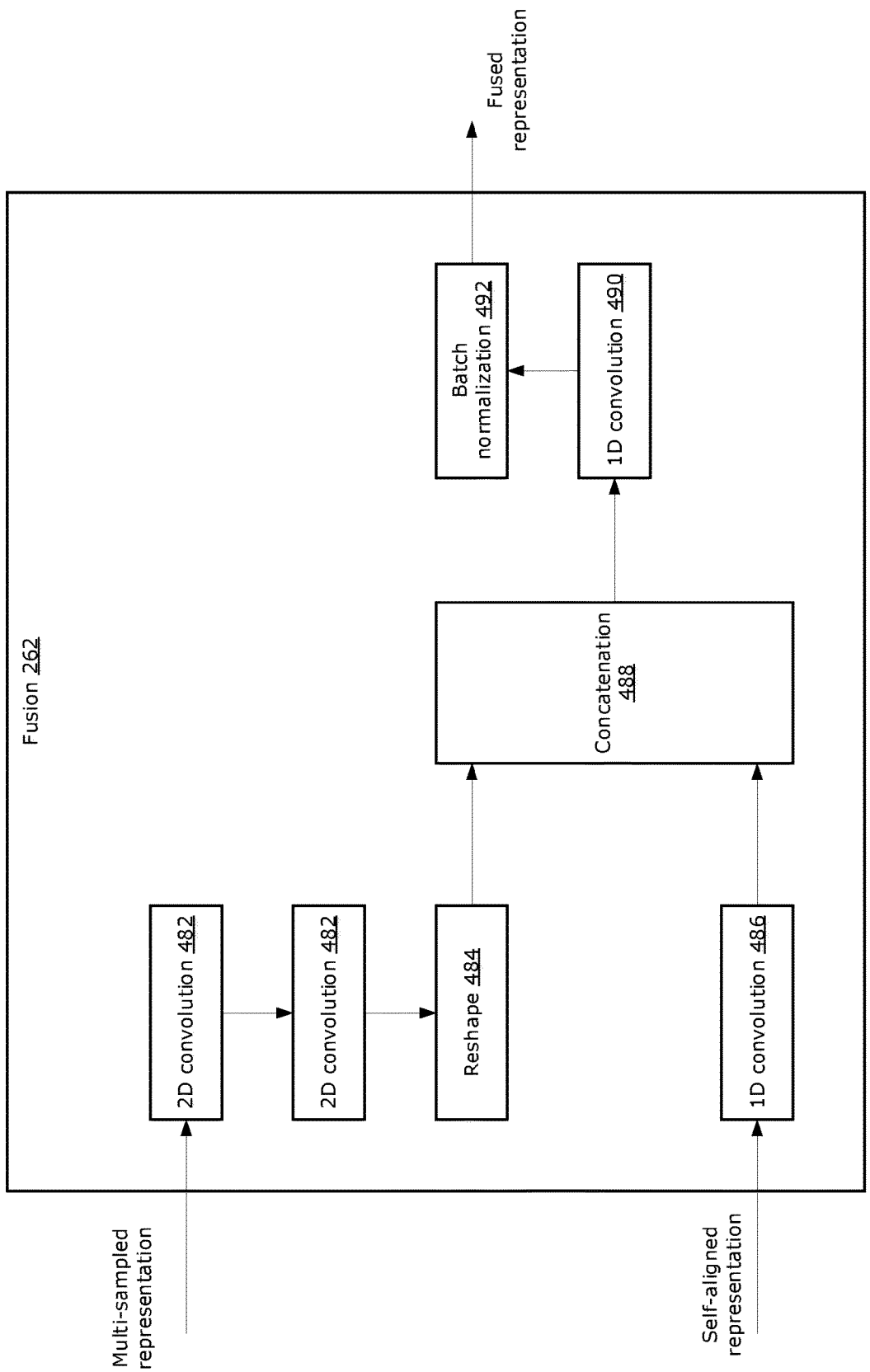

FIG. 4C illustrates an example neural network architecture of the fusion operation 262. It should be understood that the example architecture shown in FIG. 4C is not intended to be limiting. Various techniques may be used to fuse the multi-sampled representation with the self-aligned representation. In this example, the multi-sampled representation is processed by one or more 2D convolutional layers 482 (two 2D convolutional layers 482 are shown in this example) and reshaped by a reshaping layer 484. The self-aligned representation is processed by a 1D convolutional layer 486. The output of the reshaping layer 484 and the 1D convolutional layer 486 are concatenated by a concatenation operation 488, then processed by another 1D convolutional layer 490 followed by a batch normalization layer 492. The output is the fused representation.

Reference is again made to FIG. 2. The fused representation (i.e., output of the fusion operation 262) is processed by the attention-based context information aggregation module 256. The attention-based context information aggregation module 256 serves to apply attention to relevant information and restrain irrelevant noise to aggregate context-aware information contained in the fused representation. Various attention mechanisms may be used for implementing the attention-based context information aggregation module 256. In some examples, the attention-based context information aggregation module 256 may be implemented using both global temporal attention and spatial attention mechanisms.

Figure 5:
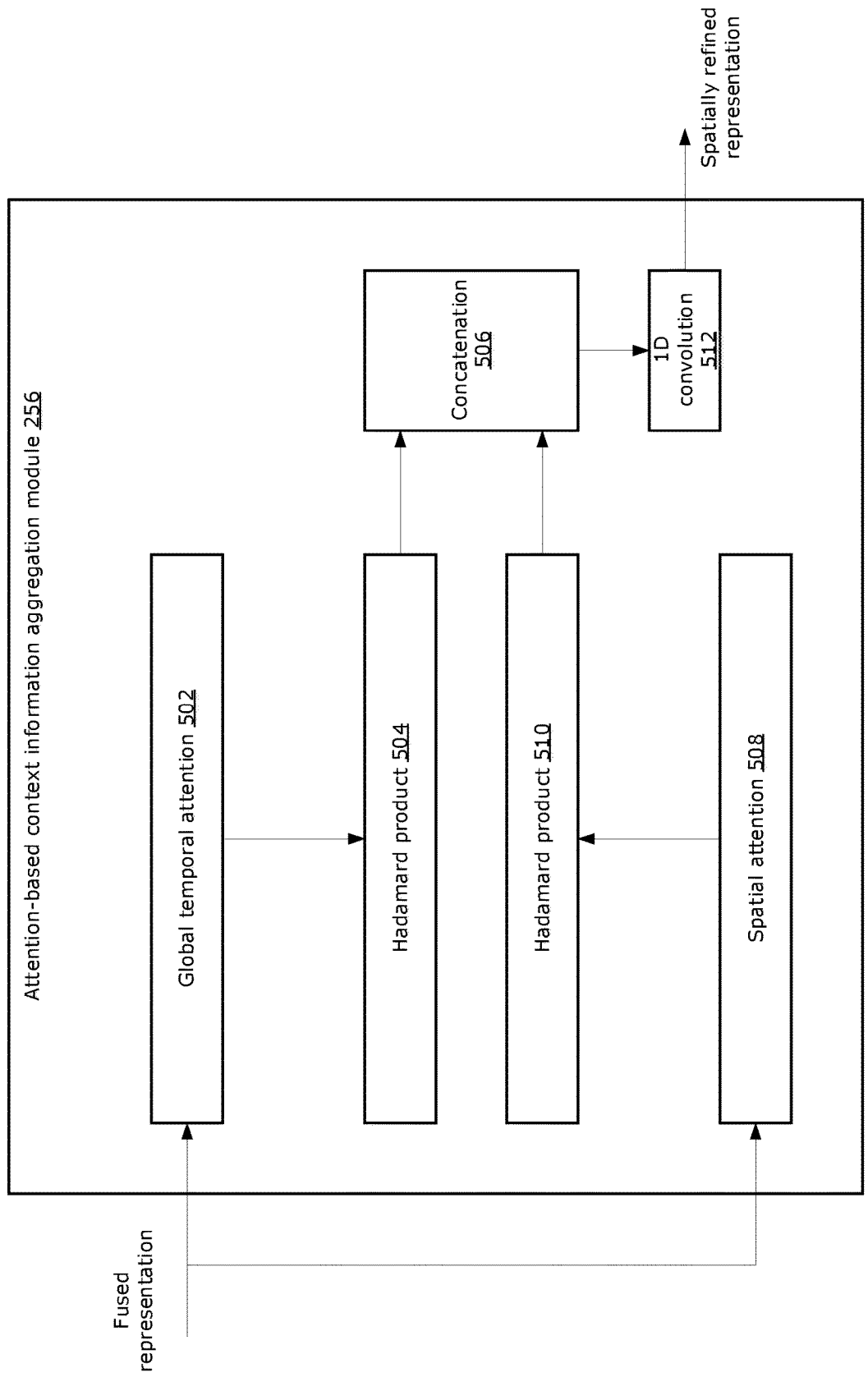
FIG. 5 illustrates an example attention-based context information aggregation module, which may be implemented in the example temporal action localization system of FIG. 2.

FIG. 5 illustrates an example neural network architecture of the attention-based context information aggregation module 256. It should be understood that the example architecture shown in FIG. 5 is not intended to be limiting.

The fused representation is processed by a global temporal attention block 502. In the global temporal attention block 502, attention weights for each temporal point are estimated. The attention weights are then applied to the fused representation using a Hadamard product operator 504. The output of the Hadamard product operator 504 is inputted to a concatenation operation 506. Global temporal attention may be useful for providing context for spatial feature. This is because class semantic information in a video data typically have variations in the temporal dimension. For example, in video data related to cooking, an action "washing hands" may occur followed by the action "preparing pasta", and then followed by the action "washing dishes". Thus, temporal attention may be useful for identifying the class semantic information at a particular temporal point.

The global temporal attention block 502 may, for example, be a transformer-based global temporal attention block (e.g., as described in Bertasius et al. "Is space-time attention all you need for video understanding?" in *JCML*, vol. 2, no. 3, 2021, p. 4). The global temporal attention block 502 may be based on multiheaded self-attention modules followed by multi-layer perceptron blocks, however other neural network architectures may be used. The output of the global temporal attention block 502 is a temporal attention weight matrix, which is applied to the fused representation using the Hadamard product operator 504.

The fused representation is also processed by a spatial attention block 508. The spatial attention block 508 estimates the spatial attention weights. The spatial attention block 508 may be based on average pooling across the temporal dimension followed by a fully connected layer to estimate spatial attention weights. The spatial attention weights, which may be outputted from the spatial attention block 508 in the form of a spatial attention weight matrix, are applied to the fused representation using another Hadamard product operator 510, the output of which is the second input to the concatenation operation 506.

The concatenation operation 506 concatenates the temporally-weighted representation with the spatially-weighted representation. A 1D convolution 512 is applied to the output of the concatenation operation 506, and the output of the 1D convolution 512 is a spatially refined representation, which is the output of the attention-based context information aggregation module 256.

Reference is again made to FIG. 2. The spatially refined representation outputted by the attention-based context information aggregation module 256 is the output from the spatial branch of the refinement module 250. Details of the temporal branch of the refinement module 250 is now discussed. As previously mentioned, the temporal branch of the refinement module 250 includes the local temporal information aggregation module 258. The local temporal information aggregation module 258 receives the self-aligned representation from the self-alignment module 252 and outputs a temporally refined representation.

Different video data inputted to the TAL system 200 may have different temporal lengths. The feature extractor 202 performs downsampling such that the feature representations (e.g., INAFs) generated from video data of different lengths all have the same dimensions. This means that there may be loss of local information. The local temporal information aggregation module 258 performs dynamic aggregation of local temporal information, which facilitates refinement of the feature representation in the local temporal dimension and helps to compensate for the lost local information. The temporal branch may be considered to be complementary to the spatial branch described above. However, in some examples, the TAL system 200 may include only the spatial branch and may omit the temporal branch.

Figure 6:
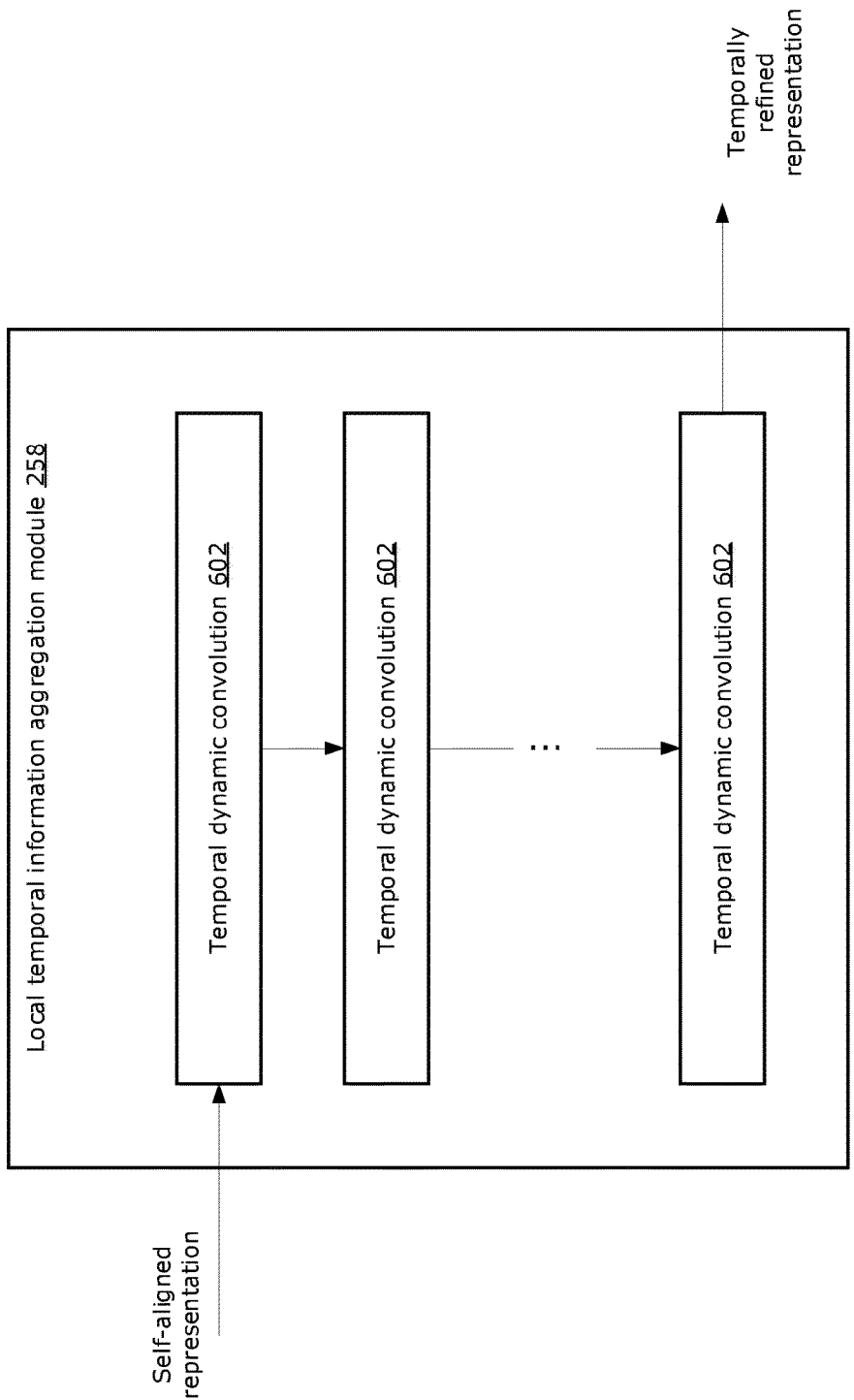
FIG. 6 illustrates an example local temporal information aggregation module, which may be implemented in the example temporal action localization system of FIG. 2.

FIG. 6 illustrates an example neural network architecture of the local temporal information aggregation module 258. It should be understood that the example architecture shown in FIG. 6 is not intended to be limiting.

As shown in FIG. 6, the local temporal information aggregation module 258 processes the self-aligned representation using one or more temporally dynamic convolution layers 602. An example of a temporally dynamic convolution layer is described by Chen et al. "Dynamic Convolution: Attention over Convolution Kernels," *CVPR*, 2020. In this example, three temporally dynamic convolution layers 602 are shown, however there may be a greater or fewer number of temporally dynamic convolution layers 602 in the local temporal information aggregation module 258. Each temporally dynamic convolution layer 602 serves to capture locally time-varying information using a plurality of time-varying convolution kernels. Each time-varying convolution kernel may be a based on a time-varying function having learnable weights. The result of applying the temporally dynamic convolution layers 602 is that local temporal information of the self-aligned representation is aggregated in the temporal dimension, thus obtaining a temporally refined representation.

Reference is again made to FIG. 2. The spatially refined representation obtained from the spatial branch of the refinement module 250 is added to the temporally refined representation obtained from the temporal branch, using a concatenation operation 264. The output of the concatenation operation 264 is the refined representation (e.g., refined INAF) that may then be processed by the localizer module 204, in order to generate predicted candidate boundary proposals as previously discussed.

The predicted candidate boundary proposals may be processed using any suitable technique to assign action boundaries (e.g., identification of start and end frames of a detected action in the video data) to the video data. For example, each candidate boundary proposal may be associated with a respective confidence score. The confidence score may be used to identify and select a defined number (e.g., one or five) of candidate boundary proposals having the highest confidence, and an aggregation (e.g., average) of the selected candidate boundary proposals may be assigned to the video data. A classification of the action may also be assigned together with each assigned action boundary. For example, each candidate boundary proposal may be associated with a respective predicted action classification as well as the respective confidence score. By multiplying each predicted action classification with the corresponding confidence score, a single action classification may be obtained, and this action classification may be assigned to the video data. The video data with assigned action classification and action boundaries may be stored in a video database, and may be further processed for other video-related tasks such as video retrieval, video recommendation, etc.

Training of the disclosed TAL system 200 is now discussed. The TAL system 200 may be trained end-to-end. In some examples, the feature extractor 202 may be pre-trained and may be excluded from training of the TAL system 200 (e.g., training of the TAL system 200 may involve learning the parameters for the refinement module 250 and localizer module 204, with the parameters of the feature extractor 202 being pre-trained and fixed).

A suitable training data for training the TAL system 200 may include video data that has been segmented into action segments, with each action segment being annotated with a ground-truth label. Each ground-truth label may include an indication of the ground-truth start (e.g., starting frame of the action segment) and an indication of the ground-truth end (e.g., ending frame of the action segment). The TAL system 200 may be trained by forward propagating a sample from the training dataset through the TAL system 200, computing a loss function, and using the computed loss function to update the trainable parameters (e.g., the parameters of the refinement module 250 and the parameters of the localizer module) using any suitable machine learning algorithm (e.g., gradient descent). The loss function may be adapted from the loss function used to train a boundary matching network (e.g., as described in Lin et al. "BMN: Boundary-matching network for temporal action proposal generation", *The IEEE International Conference on Computer Vision (ICCV)*, 2019).

After the TAL system 200 has been suitably trained, the trained parameters may be stored in memory. The trained TAL system 200 may then be used during inference to predict action boundaries for video data.

Figure 7:
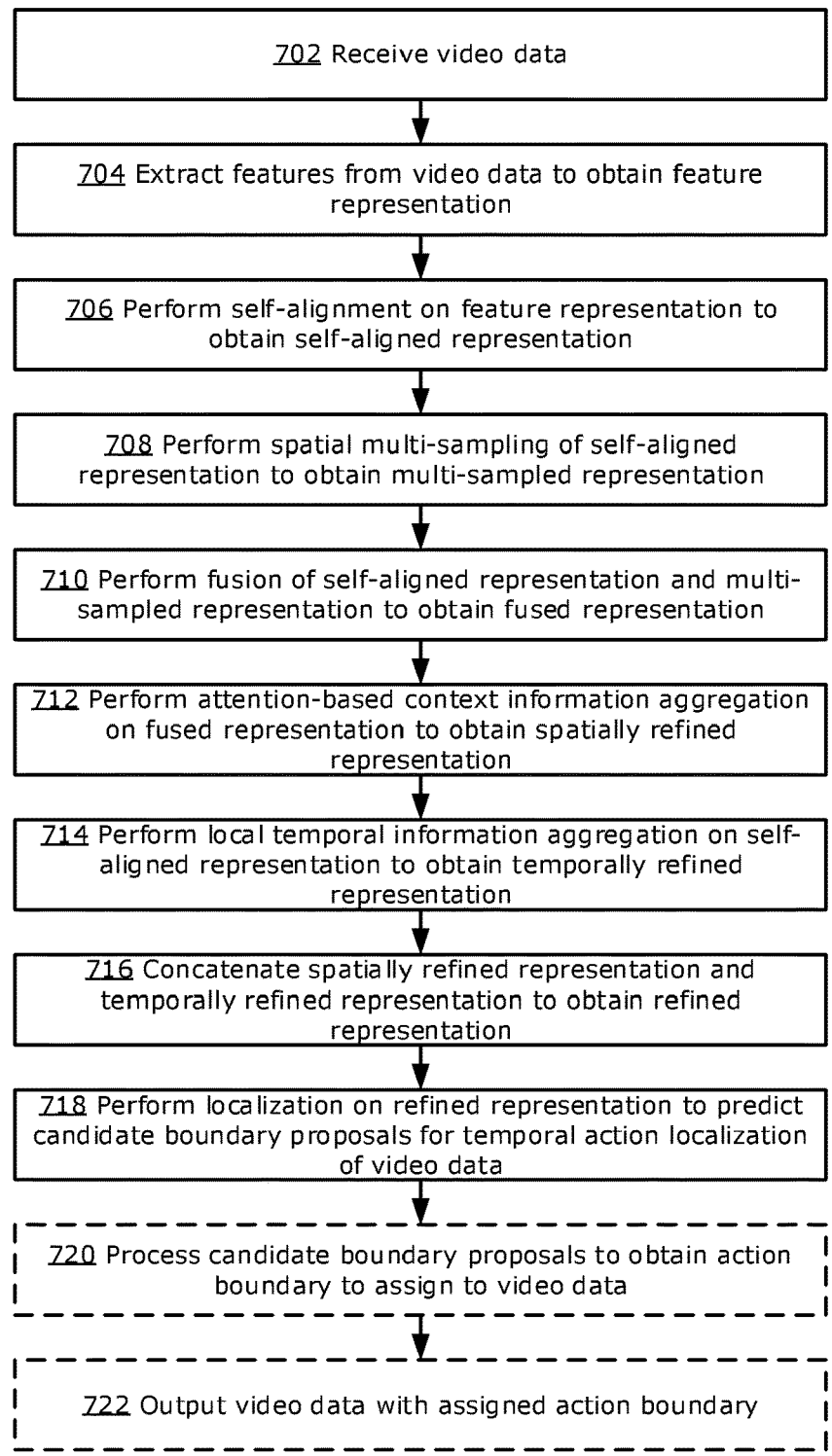
FIG. 7 is a flowchart illustrating an example method for temporal action localization, in accordance with examples of the present disclosure.

FIG. 7 is a flowchart illustrating an example method 700 for performing temporal action localization using the trained TAL system 200. The method 700 may be performed using any suitable computing system (e.g., the computing system 200) that is configured for performing computations required for executing a neural network.

At 702, video data is received. The video data may, for example, be a set of video frames. The video data may be untrimmed, meaning that the video data may include action frames (i.e., video frames capturing an action) as well as non-action frames.

At 704, the video data is processed (e.g., using the feature extractor 202) to extract features, for example in the form of an extracted feature representation. The feature representation may be a 2D feature representation (e.g., in the form of an INAF) in which spatial information is encoded along one dimension and temporal information is encoded along a second dimension.

In some examples, the feature representation may be extracted from the video data prior to the method 700, and steps 702 and 704 may be replaced with a single step of obtaining the feature representation. For example, the feature representation may be extracted from the video data ahead of time and stored in a database. Then steps 702 and 704 may be replaced with a single step of obtaining the feature representation from the database.

At 706, a self-alignment operation is performed (e.g., using the self-alignment module 252) on the feature representation. The result of the self-alignment is a self-aligned representation, which is aligned in the spatial dimension. This means that, in the self-aligned representation, similar features are grouped together in the spatial dimension.

In some examples, performing self-alignment may involve processing the feature representation through one or more neural network layers, such as at least a fully connected layer and an alignment layer (e.g., as described above with respect to the self-alignment module 252).

At 708, spatial multi-sampling of the self-aligned representation is performed (e.g., using the multi-head sampling module 254) to obtain a multi-sampled representation. One or more neural network layers may be used to perform the sampling. The multi-sampling may, for example be performed by obtaining a plurality of sparse samples of the self-aligned representation along the spatial dimension using a respective plurality of learned filters (e.g., learned 1D sampling layer). The filters are learned such that the samples are context-related features. Each filter obtains a vector of sampled points along a respective index in the temporal dimension. Then the vectors of sampled points are combined to form the multi-sampled representation.

At 710, fusion of the self-aligned representation and the multi-sampled representation is performed (e.g., using the fusion operation 262) to obtain a fused representation. Fusion may be performed by processing the self-aligned representation and the multi-sampled representation through one or more neural network layers, such one or more convolution layers and further performing concatenation (e.g., as described above with respect to the fusion operation 262).

At 712, an attention-based context information aggregation operation is performed (e.g., using the attention-based context information aggregation module 256) on the fused representation to obtain a spatially refined representation. Performing attention-based context information aggregation may involve applying global temporal attention to the fused representation to obtain a temporally-weighted representation; applying spatial attention to the fused representation to obtain a spatially-weighted representation; and concatenating the temporally-weighted representation and the spatially-weighted representation. Thus, steps 708-712 may be performed to obtain the spatially refined representation from the self-aligned representation.

At 714, local temporal information aggregation is performed (e.g., using the local temporal information aggregation module 258) on the self-aligned representation to obtain a temporally refined representation. Performing local temporal information aggregation may involve applying one or more temporally dynamic convolution layers to the self-aligned representation. Performing local temporal information aggregation causes temporal information of the self-aligned representation to be aggregated in the temporal dimension, thus obtaining the temporally refined representation.

It should be noted that the spatially refined representation and the temporally refined representation may be obtained in any order and/or in parallel. Thus, step 714 may be performed prior to, during, or after steps 708-712. In some examples, steps 708-712 may be performed by a spatial branch of the refinement module 250 of the TAL system 200, and step 714 may be performed by a temporal branch of the refinement module 250 of the TAL system 200.

At 716, the spatially refined representation and the temporally refined representation are concatenated (e.g., using the concatenation operation 264) to obtain a refined representation (e.g., in the form of a refined INAF).

In some examples, steps 714-716 may be omitted and the spatially refined representation may be used as the refined representation in step 718 (i.e., the refined representation may be obtained by obtaining the spatially refined representation).

At 718, action localization is performed (e.g., using a localizer module 204) to predict one or more candidate boundary proposals for temporal action localization of the video data. Each predicted candidate boundary proposal includes at least an indication of a start (e.g., starting frame or starting timestamp) and an end (e.g., ending frame or ending timestamp) of an action in the video data. Each predicted candidate boundary proposal may also be associated with a confidence score and a predicted action classification.

The predicted candidate boundary proposal(s) may be outputted to be further processed by another computing system, in order to assign an action boundary to the video data. In some examples, the method 700 may include steps 720-722 to process the candidate boundary proposal(s) and assign an action boundary to the video data.

Optionally, at 720, the candidate boundary proposal(s) may be processed to obtain an action boundary to assign to the video data. An action classification may also be assigned to the video data with the action boundary. When there are multiple candidate boundary proposals predicted by the localization, the candidate boundary proposals may be ranked according to the respective confidences scores and a defined number of highest-confidence candidate boundary proposals may be selected. The selected candidate boundary proposals may be aggregated (e.g., averaged) to obtain an action boundary (e.g., indicating the start and end of an action) to be assigned to the video data. A single action classification may be aggregated by multiplying the action classification associated with each candidate boundary proposal with the associated confidence score and obtaining the weighted average. This may then be assigned to the video data together with the assigned action boundary.

Optionally, at 722, the video data with assigned action boundary (and optionally assigned action classification) may be outputted. For example, the video data with assigned action boundary and optional action classification may be outputted to be stored in a video database. In some examples, the action boundary (and optionally the action classification) to be assigned to the video data may be outputted instead of the video data with assigned action boundary (and optionally assigned action classification). For example, the action boundary and optional action classification may be outputted to another computer system that maintains video data in the video database.

The video data with temporal action localization may then be used for other video tasks, such as video retrieval, video recommendation, etc.

In various examples, the present disclosure has described systems and methods for temporal action localization of video data. A temporal action localization system is described that performs spatial feature alignment, dynamic local and global temporal information aggregation and multi-head sampling. The spatial alignment may help to reduce spatial misalignment in the video data by aligning spatial information along the temporal dimension. Dynamic local and global temporal information aggregation may help to enhance important spatial and temporal channels. Multi-head sampling performs sparse feature sampling, using learned feature-feature correlations in the spatial dimension. These modules help to enhance features relevant to prediction of action boundaries.

Examples of the present disclosure may be used for various video understand tasks, and may be used for video retrieval, video grounding and/or video recommendation tasks, as well as other video-related applications such as video tagging, consumer behavior analysis, patient monitoring, etc.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A temporal action localization system comprising:
a processing unit configured to execute instructions to cause the system to:
receive a feature representation extracted from a video data, the feature representation having a temporal dimension and a spatial dimension;
process the feature representation to obtain a self-aligned representation that is aligned in the spatial dimension;
perform spatial multi-sampling of the self-aligned representation to obtain a multi-sampled representation, wherein performing the spatial multi-sampling includes obtaining a plurality of sparse samples of the self-aligned representation along the spatial dimension;
fuse the self-aligned representation and the multi-sampled representation to obtain a fused representation;
apply attention-based context information aggregation on the fused representation to obtain a spatially refined representation;
wherein the processing unit is configured to cause the system to implement an attention-based context information aggregation module to perform the attention-based context information aggregation, the attention-based context information aggregation module comprising:
a global temporal attention block configured to apply global temporal attention to the fused representation to obtain a temporally-weighted representation; and
a spatial attention block configured to apply spatial attention to the fused representation to obtain a spatially-weighted representation;
wherein the spatially refined representation is obtained by concatenating the temporally-weighted representation and the spatially-weighted representation;
apply local temporal information aggregation on the self-aligned representation to obtain a temporally refined representation; and
perform action localization on a concatenation of the spatially refined representation and the temporally refined representation to obtain at least one boundary proposal for temporal action localization of an action in the video data.

2. The system of claim 1, wherein the processing unit is configured to cause the system to implement a self-alignment module to align the feature representation in the spatial dimension, the self-alignment module comprising a plurality of neural network layers including at least a fully connected layer and an alignment layer.

3. The system of claim 1, wherein the processing unit is configured to cause the system to implement a multi-head sampling module to perform the spatial multi-sampling, the multi-head sampling module comprising a plurality of neural network layers including a plurality of trained 1D sampling layers, each 1D sampling layer being configured to obtain a respective vector of sparse samples along a respective index in the spatial dimension, the vectors of sparse samples being combined to obtain the multi-sampled representation.

4. The system of claim 1, wherein the processing unit is configured to cause the system to implement a local temporal information aggregation module to perform the local temporal information aggregation, the local temporal information aggregation module comprising a plurality of neural network layers including one or more temporally dynamic convolution layers.

5. The system of claim 1, wherein a plurality of boundary proposals are obtained, and wherein the processing unit is configured to cause the system to:
aggregate the plurality of boundary proposals to obtain one boundary proposal to temporally localize the action in the video data.

6. The system of claim 5, wherein each of the plurality of boundary proposals is associated with a respective confidence score, wherein aggregating the plurality of boundary proposals comprises aggregating a defined number of boundary proposals having highest confidence scores.

7. The system of claim 6, wherein each of the plurality of boundary proposals is associated with a respective action classification, wherein the action classifications are aggregated using the confidence scores as weighting, and one aggregated action classification is assigned to the action in the video data.

8. The system of claim 1, wherein the processing unit is configured to cause the system to store the video data with at least one assigned boundary proposal in a video database.

9. The system of claim 1, wherein the processing unit is configured to cause the system to implement a feature extractor to extract the feature representation from the video data, wherein the extracted feature representation is an implicit neural action field.

10. A method comprising:
receiving a feature representation extracted from a video data, the feature representation having a temporal dimension and a spatial dimension;
processing the feature representation to obtain a self-aligned representation that is aligned in the spatial dimension;
performing spatial multi-sampling of the self-aligned representation to obtain a multi-sampled representation, wherein performing the spatial multi-sampling includes obtaining a plurality of sparse samples of the self-aligned representation along the spatial dimension;
fusing the self-aligned representation and the multi-sampled representation to obtain a fused representation;
applying attention-based context information aggregation on the fused representation to obtain a spatially refined representation;
wherein the attention-based context information aggregation is performed by an attention-based context information aggregation module comprising:
a global temporal attention block configured to apply global temporal attention to the fused representation to obtain a temporally-weighted representation; and
a spatial attention block configured to apply spatial attention to the fused representation to obtain a spatially-weighted representation;
wherein the spatially refined representation is obtained by concatenating the temporally-weighted representation and the spatially-weighted representation;
applying local temporal information aggregation on the self-aligned representation to obtain a temporally refined representation; and
performing action localization on a concatenation of the spatially refined representation and the temporally refined representation to obtain at least one boundary proposal for temporal action localization of an action in the video data.

11. The method of claim 10, wherein the feature representation is processed by a self-alignment module to align the feature representation in the spatial dimension, the self-alignment module comprising a plurality of neural network layers including at least a fully connected layer and an alignment layer.

12. The method of claim 10, wherein the spatial multi-sampling is performed by a multi-head sampling module comprising a plurality of neural network layers including a plurality of trained 1D sampling layers, each 1D sampling layer being configured to obtain a respective vector of sparse samples along a respective index in the spatial dimension, the vectors of sparse samples being combined to obtain the multi-sampled representation.

13. The method of claim 10, wherein the local temporal information aggregation is performed by a local temporal information aggregation module comprising a plurality of neural network layers including one or more temporally dynamic convolution layers.

14. The method of claim 10, wherein a plurality of boundary proposals are obtained, the method further comprising:
aggregating the plurality of boundary proposals to obtain one boundary proposal to temporally localize the action in the video data.

15. The method of claim 14, wherein each of the plurality of boundary proposals is associated with a respective confidence score, wherein aggregating the plurality of boundary proposals comprises aggregating a defined number of boundary proposals having highest confidence scores.

16. The method of claim 15, wherein each of the plurality of boundary proposals is associated with a respective action classification, wherein the action classifications are aggregated using the confidence scores as weighting, and one aggregated action classification is assigned to the action in the video data.

17. The method of claim 10, further comprising:
extracting the feature representation from the video data, wherein the extracted feature representation is an implicit neural action field.

18. A non-transitory computer-readable medium storing computer-executable instructions, wherein the instructions are executable by a processing unit of a computing system to cause the system to:
receive a feature representation extracted from a video data, the feature representation having a temporal dimension and a spatial dimension;
process the feature representation to obtain a self-aligned representation that is aligned in the spatial dimension;
perform spatial multi-sampling of the self-aligned representation to obtain a multi-sampled representation, wherein performing the spatial multi-sampling includes obtaining a plurality of sparse samples of the self-aligned representation along the spatial dimension;
fuse the self-aligned representation and the multi-sampled representation to obtain a fused representation;
apply attention-based context information aggregation on the fused representation to obtain a spatially refined representation;
wherein the instructions further cause the system to implement an attention-based context information aggregation module to perform the attention-based context information aggregation, the attention-based context information aggregation module comprising:
a global temporal attention block configured to apply global temporal attention to the fused representation to obtain a temporally-weighted representation; and
a spatial attention block configured to apply spatial attention to the fused representation to obtain a spatially-weighted representation;
wherein the spatially refined representation is obtained by concatenating the temporally-weighted representation and the spatially-weighted representation;
apply local temporal information aggregation on the self-aligned representation to obtain a temporally refined representation; and
perform action localization on a concatenation of the spatially refined representation and the temporally refined representation to obtain at least one boundary proposal for temporal action localization of an action in the video data.

* * * * *